United States Patent Office 2,852,568
Patented Sept. 16, 1958

2,852,568
PREPARATION OF CYCLOALKADIENYL DERIVATIVES OF PHENOLIC COMPOUNDS

Louis Schmerling, Riverside, Ill., assignor to Universal Oil Products Company, Des Plaines, Ill., a corporation of Delaware No Drawing. Application September 13, 1956
Serial No. 609,549

10 Claims. (Cl. 260—621)

This invention relates to a process for preparing polycyclic hydroxy substituted compounds and more particularly to a process for the preparation of cycloalkadienylphenols.

It is an object of this invention to prepare polycyclic hydroxy substituted compounds.

A further object of this invention is to prepare polycyclic hydroxy substituted compounds by reacting a cycloalkadienyl alkali metal compound with a halophenolic compound.

One embodiment of this invention is found in a process for the preparation of a cycloalkadienyl derivative of a phenolic compound which comprises condensing a cycloalkadienyl alkali metal with a halophenolic compound, and recovering the resultant compound.

A further embodiment of this invention is found in a process for the preparation of a cycloalkadienyl derivative of a phenolic compound which comprises condensing a cycloalkadienyl alkali metal with a halophenolic compound at a temperature in the range of from about 0° to about 100° C. and in the presence of an inert organic solvent, and recovering the resultant compound.

A specific embodiment of the invention is found in a process for the preparation of a cycloalkadienyl derivative of a phenolic compound which comprises condensing cyclopentadienyl sodium with a halophenolic compound at a temperature in the range of from about 0° to about 100° C., and recovering the resultant compound.

A more specific embodiment of the invention is found in a process for the preparation of p-(2,4-cyclopentadienylmethyl)phenol which comprises condensing cyclopentadienyl sodium with p-(chloromethyl)phenol at a temperature in the range of from about 10° to about 30° C. in the presence of ethanol, and recovering the resultant p-(2,4-cyclopentadienylmethyl)phenol.

Other objects and embodiments referring to alternative cycloalkadienyl alkali metals and alternative halophenolic compounds will be found in the following further detailed description of the invention.

The products of the invention comprising cycloalkadienyl derivatives of phenolic compounds which are prepared according to the process of this invention find a wide variety of uses in the chemical industry. For example, the cycloalkadienylphenols may be used as intermediates in the preparation of plastics and of pharmaceuticals. In addition, a cycloalkadienylphenol such as p-(2,4-cyclopentadienyl)phenol may be polymerized to form a resin or a plastic which may then be molded into any desired shape. Also, the abovementioned compound may be copolymerized with other polymerizable organic compounds such as diolefins or vinyl derivatives (for example, isoprene, vinyl chloride, vinyl acetate, etc.) to also form resins or plastics, the desired end product depending upon the amount of polymerization or copolymerization which the p-(2,4-cyclopentadienyl)phenol will undergo.

The process of this invention will take place at a temperature in the range of from about 0° to about 100° C. and often preferably at a temperature in the range of from about 10° to about 30° C., the temperature depending largely on the activity of the halophenolic compound used. In addition, pressures ranging from atmospheric to about 50 atmospheres or more may be used, the amount of pressure used being sufficient to maintain at least a portion of the reactants in liquid phase. If so desired, the process may be effected in the presence of inert organic solvents including alcohols such as methanol and ethanol; aromatic hydrocarbons such as benzene, toluene, the xylenes, etc.; and aliphatic hydrocarbons such as pentane, hexane, heptane etc.

Suitable cycloalkadienyl alkali metals which may be used in this invention include 2,4-cyclopentadienyl lithium, 2,4-cyclopentadienyl sodium, 2,4-cyclopentadienyl potassium, 2,4-cyclopentadienyl rubidium, 2,4-cyclopentadienyl cesium, 2,5-cyclohexadienyl lithium, 2,5-cyclohexadienyl sodium, 2,5-cyclohexadienyl potassium, 2,5-cyclohexadienyl rubidium, 2,5-cyclohexadienyl cesium, etc. In addition, it is also contemplated within the scope of this invention that the cycloalkadienyl alkaline earth metals such as cyclopentadienyl magnesium, cyclopentadienyl calcium, cyclopentadienyl barium, etc., may also be used, but not necessarily with equivalent results.

The cycloalkadienyl alkali metal compounds are usually prepared in situ by the addition of a cycloalkadiene containing a methylene group between two doubly-bonded carbon atoms to a solution or suspension of the alkali metal in an inert solvent as mentioned above. Thus, for the purposes of this specification and claims it is considered that the primary product formed, for example, on the addition of 1,3-cyclopentadiene (hereinafter referred to merely as cyclopentadiene) to a solution of sodium ethoxide in absolute ethanol is 2,4-cyclopentadienyl sodium.

Halophenolic compounds which may be condensed with the abovementioned cycloalkadienyl alkali metals include mono-, di-, tri- and higher polyhydric halophenols, the preferred halogens being chlorine and bromine, said halophenols including in particular halophenolic compounds in which the halogen is attached to a carbon atom in alpha position to the aromatic nucleus, such compounds including p-(chloromethyl)phenol, p-(bromomethyl)phenol, p-(α-chloroethyl)phenol, p-(α-bromoethyl)phenol, o - α - chloroisopropylphenol, 2 - (chloromethyl)naphthol, etc. In addition, other useful halophenolic compounds include p-(β-chloroethyl)phenol, o-bromophenol, o-chlorophenol, 2-chlorohydroquinone, 2-bromohydroquinone, 3-chloropyrocatechol, 4-chloropyrocatechol, 3-bromopyrocatechol, 4-bromopyrocatechol, 4-chlororesorcinol, 5-chlororesorcinol, 4-bromoresorcinol, 5-bromoresorcinol, 4-chloropyrogallol, 5-chloropyrogallol, 4-bromopyrogallol, 5-bromopyrogallol, 5-chlorohydroxyhydroquinone, 5-bromohydroxyhydroquinone, 4-chlorophloroglucinol, 5-bromophloroglucinol, 3-chloro-1,2,4,-5-tetrahydroxybenzene, 3-bromo - 1,2,4,5-tetrahydroxybenzene, 4-chloro-1,2,3,5-tetrahydroxybenzene, 4-bromo-1,2,3,5-tetrahydroxybenzene, etc., 2-chloro-1-naphthol, 3-chloro-1-naphthol, 4-chloro-1-naphthol, 5-chloro-1-naphthol, 6-chloro-1-naphtol, 2-bromo-1-naphthol, 3-bromo-1-naphthol, 4-bromo-1-naphthol, 5-bromo-1-naphthol, 6-bromo-1-naphthol, 4-chloro-1,2-naphthalenediol, 5-chloro-1,2-naphthalenediol, 6-chloro-1,2-naphthalenediol, 7-chloro-1,2-naphthalenediol, 4-bromo-1,2-naphthalenediol, 5-bromo-1,2-naphthalenediol, 6-bromo-1,2-naphthalenediol, 7-bromo-1,2-naphthalenediol, the chloro- and bromoanthrols, phenanthrols, chrysols, pyrols, etc. It is to be understood that the above enumerated halophenolic compounds are only representative of the class of compounds which may be used, and that the present invention is not limited thereto.

It is also contemplated within the scope of this invention that derivatives of the cycloalkadienylphenols such as alkyl ethers and esters thereof may also be obtained by either condensing a halophenylalkyl ether or halophenyl ester such as p-(chloromethyl)anisole, o-bromoanisole, p-(chloromethyl)phenetole, etc., with a cycloalkadienyl alkali metal or by reacting a cycloalkadienyl phenol prepared according to the abovementioned process with an alkylating or acylating agent.

The process of this invention may be effected in any suitable manner and may comprise either a batch or a continuous type operation. For example, when a batch type operation is used, a quantity of the starting materials comprising a cycloalkadiene containing a methylene group between two doubly-bonded carbon atoms; an alkali metal, and, if desired an inert organic solvent is placed in a condensation apparatus provided with heating or cooling means, and a means of mixing, the flask is adjusted to the desired temperature, and the halophenolic compound is added at a predetermined rate for a predetermined residence time. At the end of this time the flask and contents thereof are allowed to return to room temperature and the desired reaction product is separated from unreacted starting materials by conventional means such as fractional distillation, crystallization, etc.

Another method of effecting the condensation reaction of the present invention is by a continuous type operation. In this type of operation the starting materials are continuously charged to a reactor which is maintained at the proper operating conditions of temperature and pressure. The reactor may comprise an unpacked vessel or coil or may contain an adsorbent packing material such as fire brick, alumina, dehydrated bauxite and the like. The reaction product is continuously withdrawn from the reactor, separated from the reactor effluent and purified by conventional means hereinbefore set forth, while the unreacted starting materials are separated and recharged to the reactor as a portion of the feed stock.

The following examples are given to illustrate the process of the present invention which, however, are not intended to limit the generally broad scope of the present invention in strict accordance therewith.

*Example I*

50 g. of cyclopentadiene is added to a solution of 23 g. of sodium in 500 cc. of absolute ethanol in a glass flask provided with an efficient stirrer. 50 g. of p-(chloromethyl)phenol is slowly added during about one hour to the stirred flask contents while the temperature is maintained at approximately 25° C. Stirring is continued for an additional two hours at the end of which time the flask contents are poured onto ice-water, treated with dilute hydrochloric acid and extracted with ether. The ether extract is washed with water, dried, and the desired product, comprising p-(2,4-cyclopentadienylmethyl)phenol, is separated therefrom by fractional distillation under reduced pressure.

*Example II*

The reaction of cyclopentadiene and o-bromophenol in the presence of sodium ethoxide using the procedure of Example I at 75° C. yields o-(2,4-cyclopentadienyl)phenol.

I claim as my invention:

1. A process for the preparation of a cycloalkadienyl derivative of a phenolic compound which comprises condensing a cycloalkadienyl alkali metal with a halophenolic compound, and recovering the resultant compound.

2. A process for the preparation of a cycloalkadienyl derivative of a phenolic compound which comprises condensing a cycloalkadienyl alkali metal with a halophenolic compound at a temperature in the range of from about 0° to about 100° C., and recovering the resultant compound.

3. A process for the preparation of a cycloalkadienyl derivative of a phenolic compound which comprises condensing a cycloalkadienyl alkali metal with a halophenolic compound at a temperature in the range of from about 10° to about 30° C., and recovering the resultant compound.

4. A process for the preparation of a cycloalkadienyl derivative of a phenolic compound which comprises condensing cyclopentadienyl sodium with a halophenolic compound at a temperature in the range of from about 0° to about 100° C., and recovering the resultant compound.

5. A process for the preparation of a cycloalkadienyl derivative of a phenolic compound which comprises condensing cyclopentadienyl potassium with a halophenolic compound at a temperature in the range of from about 0° to about 100° C., and recovering the resultant compound.

6. A process for the preparation of a cycloalkadienyl derivative of a phenolic compound which comprises condensing cyclopentadienyl lithium with a halophenolic compound at a temperature in the range of from about 0° to about 100° C., and recovering the resultant compound.

7. A process for the preparation of a cycloalkadienyl derivative of a phenolic compound which comprises condensing cyclopentadienyl alkali metal with p-(chloromethyl)phenol at a temperature in the range of from about 0° to about 100° C., and recovering the resultant compound.

8. A process for the preparation of a cycloalkadienyl derivative of a phenolic compound which comprises condensing a cyclopentadienyl alkali metal with o-bromophenol at a temperature in the range of from about 0° to about 100° C., and recovering the resultant compound.

9. A process for the preparation of p-(2,4-cyclopentadienylmethyl)phenol which comprises condensing cyclopentadienyl sodium with p-(chloromethyl)phenol at a temperature in the range of from about 0° to about 100° C. in the presence of an inert organic solvent, and recovering the resultant p-(2,4-cyclopentadienylmethyl)phenol.

10. A process for the preparation of p-(2,4-cyclopentadienylmethyl)phenol which comprises condensing cyclopentadienyl sodium with p-(chloromethyl)phenol at a temperature in the range of from about 0° to about 100° C. in the presence of an alcohol, and recovering the resultant p-(2,4-cyclopentadienylmethyl)phenol.

References Cited in the file of this patent

UNITED STATES PATENTS

| | | |
|---|---|---|
| 2,002,447 | Deichsel | May 21, 1935 |
| 2,202,877 | Stevens et al. | June 4, 1940 |
| 2,681,371 | Gaydasch et al. | June 15, 1954 |
| 2,726,232 | Upson | Dec. 6, 1955 |

OTHER REFERENCES

Alder et al.: Chem. Abstracts, vol. 30 (1936), p. 8177.